(12) United States Patent
Liang

(10) Patent No.: US 9,955,822 B2
(45) Date of Patent: May 1, 2018

(54) ADJUSTABLE NUTCRACKER

(71) Applicant: Zhihai Liang, San Diego, CA (US)

(72) Inventor: Zhihai Liang, San Diego, CA (US)

( * ) Notice: Subject to any disclaimer, the term of this patent is extended or adjusted under 35 U.S.C. 154(b) by 264 days.

(21) Appl. No.: 14/874,428

(22) Filed: Oct. 3, 2015

(65) Prior Publication Data

US 2017/0095123 A1    Apr. 6, 2017

(51) Int. Cl.
*A47J 17/00* (2006.01)
*A47J 43/26* (2006.01)

(52) U.S. Cl.
CPC ..................... *A47J 43/26* (2013.01)

(58) Field of Classification Search
USPC ............... 99/568; 30/120.3–120.5; 452/6
See application file for complete search history.

(56) References Cited

U.S. PATENT DOCUMENTS

| | | | | |
|---|---|---|---|---|
| 4,171,567 A | * | 10/1979 | Papalardo | A47J 43/26 30/120.4 |
| 4,173,825 A | * | 11/1979 | Papalardo | A47J 43/26 30/120.3 |
| 4,425,707 A | * | 1/1984 | Polsfuss | A47J 43/26 30/120.3 |
| 7,361,080 B2 | * | 4/2008 | Martin | A22C 29/024 452/6 |
| 2008/0086890 A1 | * | 4/2008 | Von Schoultz | A47J 43/26 30/120.5 |

FOREIGN PATENT DOCUMENTS

CN     201595725 U   * 10/2010  ............. A47J 43/26

* cited by examiner

*Primary Examiner* — Nina Bhat

(57) ABSTRACT

A plier's nutcracker includes a hand tightening screw mounted through a threaded hole on one handle of a plier type nutcracker at a position adjacent to nutcracker's pivotal connection. The engagement of this hand tighten screw through tightening and untightening regulates the pressure the nut or object to be crushed shall receive in a cracking operation. The pressure shall result in either large broken hull pieces or hand-breakable cracks on the hull or shell effectively eliminating the scattering of shells and hulls in the cracking operation while keeping the kernel in one whole piece or fewer big pieces. Additionally, the engagement of the hand tighten screw creates a safe distance between the nutcracker handles to prevent fingers from being pinched in a cracking operation.

1 Claim, 2 Drawing Sheets

ADJUSTABLE NUTCRACKER

CROSS REFERENCE TO RELATED APPLICATIONS

Not Applicable

FEDERALLY SPONSORED RESEARCH

Not applicable

SEQUENCE LISTING OR PROGRAM

Not applicable

BACKGROUND

Field of Invention

This invention relates to an improved cracking device, and more specifically to a new nutcracker which is adjustable to prevent the scattering of shells and hulls and to eliminate smashing the kernel of nuts and pinching fingers in the cracking operation.

Prior Art

Various non-adjustable nutcrackers capable of cracking nuts of different sizes and shapes are known in the art and are shown in, for example, in U.S. Pat. No. 509,412 (Lee), U.S. Pat. No. 461,377 (Law), U.S. Pat. No. 454,036 (Tse) and others. There are also nutcrackers that are adjustable to accommodate nuts of various sizes and shapes in the art and are shown, for example in U.S. Pat. No. 4,173,825 (Papalardo), U.S. Pat. No. 3,148,718 (Plott), U.S. Pat. No. 2,758,622 (Blatt), U.S. Pat. No. 2,444,634 (Daniel), U.S. Pat. No. 2,031,189 (Stromberg), U.S. Pat. No. 1,938,733 (Walling), U.S. Pat. No. 1,281,575 (Ives), and others. The design of all these prior art cracking devices is such that they generally are prone to causing the scattering of shells and hulls and smashing the kernel of nuts into small pieces in the cracking operation, because none of them has the capability of controlling the pressure over the nut in a cracking operation. Due to the lack of mechanism to control the pressure, improper use of some of the existing nutcrackers may result in pinching one's finger(s) when one attempts to squeeze too hard or put one's finger(s) in between the handles either inadvertently or in an attempt to obtain the optimum pressure in the cracking operation.

There is a nutcracker probably capable of limiting the scattering of shells and hulls known in the art and is shown in U.S. Pat. No. 2,804,111 (Burchett). But the Burchett patented cracking device does not solve the problem of smashing the kernel of nuts. Additionally, as its positioning screw is pressed directly against nut shell or hulls, it is prone to damages with use due to the direct pressure the screw surface receives in the cracking operation. Further, as the Burchett cracking device has a crushing chamber designed to house round-shaped nuts, other oddly-shaped nuts as well as other hard-shelled edibles such as lobster or crab claws will not fit into the chamber, as a result, the utility of the Burchett cracking device is limited.

SUMMARY

In accordance with the embodiment, a nutcracker comprises a screw mounted through a threaded hole on one handle next to the connecting rivet of the clamp type nutcracker, such screw limits the travel distance between nutcracker handles when the nutcracker handles are being squeezed in a cracking operation.

DRAWINGS—FIGURES

DETAILED DESCRIPTION

Figure 1:
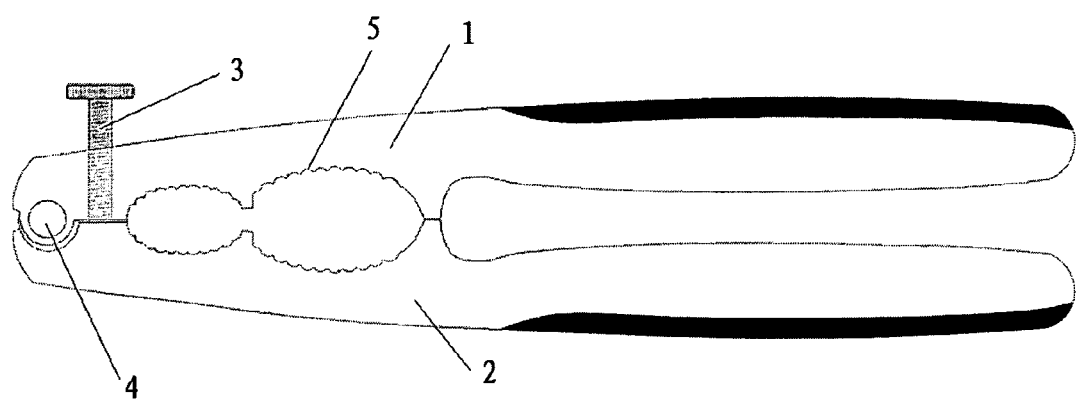
FIG. 1 shows the position of the screw that limits the travel distance between nutcracker handles in a state when the screw is not engaged.
Figure 2:
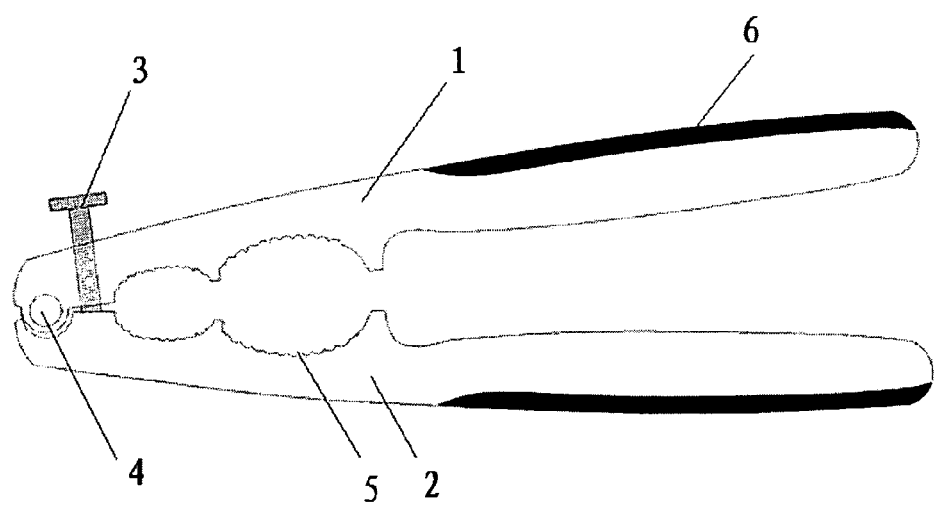
FIG. 2 shows the state where the screw is engaged resulting an increased distance between the two handles of the nutcracker relative to the state the screw is not engaged as in FIG. 1.

The embodiment of my invention is illustrated in FIG. 1. The cracking device comprises two handles 1 and 2, the two handles are pivotally connected at one end 4 of the cracker. Adjacent to the pivotal connection is a threaded hole with predetermined dimension on one handle 1 with a screw going through the threaded hole 3. The screw 3 is a hand tighten screw with predetermined thickness and length. Tightening the screw drives it (the screw) through the threaded hole so that the end of the screw touches against the inner surface of the other handle, thereby creating a gap between the two handles as illustrated in FIG. 2, the extent the hand tighten screw being tightened determines the size of the gap between the two handles. As the end of the screw touches solidly against the inner surface of the other handle, it effectively stops the handles from any further moving towards each other no matter how hard the handles are being squeezed, thereby determines the pressure the nut or object to be crushed shall receive in a cracking operation.

Operation—FIG. 1, 2, 3, 4

The manner of using this nutcracker is as follows:

First, put the hand tighten screw in the non-engaged state as in FIG. 1, then put the nut or object to be crushed in the crushing area 5 between the handles, gently close the handles to just hold the nut without crushing its hulls.

Second, begin tightening the hand tighten screw to have its end going towards touching against the inner surface of the other handle as in FIG. 2.

Figure 3:
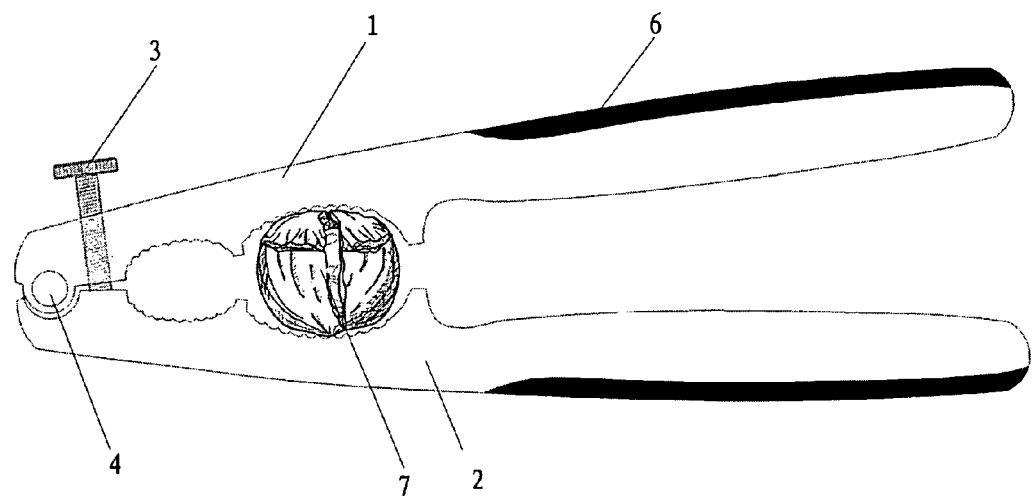
FIG. 3 shows the engagement of the screw that limits the travel distance between the two handles of the nutcracker when a hazelnut is being cracked.
Figure 4:
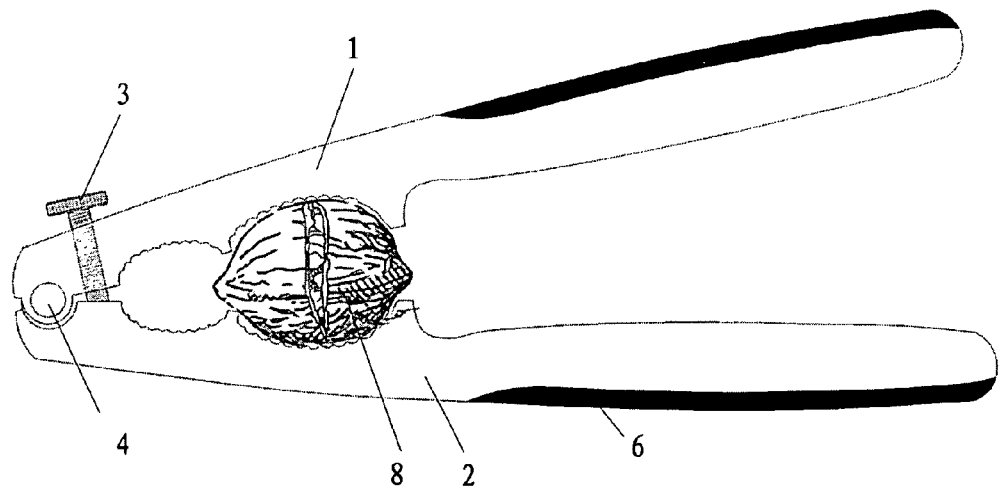
FIG. 4 shows the engagement of the screw that limits the travel distance between the two handles of the nutcracker in cracking a larger object such as a chestnut.

Third, stop tightening the hand tighten screw where the space between the crushing surface and the nut's hull is approximately the same as the thickness of the hull of the nut, normally said space would be between approximately 1-2 mm as in FIG. 3 and FIG. 4.

Fourth, hold the nut with fingers of the other hand to keep the nut within and/or from falling out of the crushing area.

Finally, squeeze the handles to start the crushing operation.

There are various possibilities with regard to the outcome when the hand tighten screw is so engaged in a crushing operation. If the hull of the nut is crushed into small pieces and even the kernel of the nut is also crushed into pieces, this means the hand tighten screw is inadequately "tightened" causing a too big a space between the crushing surface and the hull of the nut, some further "tightening" of the hand tighten screw is needed to reduce the space to achieve the desirable outcome, namely, just crushing the hull lightly or enough to break it into two or a few large pieces without breaking the kernel. If the hull of the nut is barely broken or result in merely visible cracks on the hull yet the cracks are not big enough to break the hull easily with fingers to take out the kernel, this means the space between the crushing surface and the hull of the nut is too small, some "untightening" of the screw is needed to enlarge the space between the crushing surface and the hull, this increased space will obtain a broken hull with large pieces or with such cracks that one can easily break the nut hull to obtain the kernel as a whole piece which is the intended outcome of this invention.

Advantages

From the description above, a number of advantages of the embodiment of my invention become evident:

(a) The hand tighten screw of my nutcracker through controlling the pressure or the crushing extent of the nut's shell or object to be crushed is to receive effectively eliminates the scattering around of crushed shells/hulls when the kernel and the hull are smashed into many small pieces (very common for baked nuts) commonly associated with the use of conventional hand-held plier type cracking devices when the handles are squeezed hard in the cracking operation. Thus, there will be no mess scene throughout the cracking operation.

(b) The hand-tighten-screw-regulated pressure or extent of crushing will result in the hull or shell of a nut or the object to be crushed being broken into just a few large pieces or with such large cracks as to enable easy peeling off the hull with fingers, the kernel shall remain whole for optimum consumption.

(c) The engagement of the hand tighten screw in the cracking operation will work to maintain a safe distance between the two handles of the nutcracker as shown in FIG. 2, which will prevent fingers from being pinched as sometimes would occur when improper operation is done with the use of a conventional hand-held plier type nutcracker, because the space between the handles in a closed state as shown in FIG. 1 (where the hand tighten screw is not engaged) is too small to tolerate finger(s) in between.

(d) The length of hand tighten screw makes the nutcracker versatile in cracking nuts of various sizes and shapes, e.g., a smaller nut such as the hazel nut as shown in FIG. 3, or a larger nut such as the walnut as shown in FIG. 4.

(e) The pliers type nutcracker can also be used in cracking other hard shell edibles such as crab or lobster claws.

CONCLUSION

Accordingly, the reader will see that the nutcracker can be used to crack hard shell edibles of various types and shapes easily and safely, it will eliminate any messy site as a result of excessively crushed hull/shell and kernel pieces common with conventional plier type nutcrackers, and keep the kernel in one whole piece for optimum consumption.

Although the description above contains some specifications, these should not be construed as limiting the scope of the embodiment but merely providing illustrations of some of the presently preferred embodiments. Thus the scope of the embodiment should be determined by the appended claims and their legal equivalents, rather than by the examples given.

I claim:

1. An improved nut cracking or shell cracking device comprising
    a first elongated member configured with a first head portion and a first handle portion;
    a second elongated member configured with a second head portion and second handle portion;
    wherein said first head portion and second head portion of said first and second elongated members are pivotally connected;
    said first head portion and second head portion form a crushing opening configured to crush different diameter shells or nuts the improvement comprising a threaded bore near the pivotal connection through the first portion of the first handle and second portion;
    a fastener threaded through said bore wherein rotation of said fastener adjusts the diameter opening of the crushing openings and prevents the first handle from contacting the second handle.

* * * * *